US009587760B1

(12) United States Patent
Sexton

(10) Patent No.: US 9,587,760 B1
(45) Date of Patent: Mar. 7, 2017

(54) PORTABLE ROTARY VALVE ACTUATOR

(71) Applicant: Daniel Sexton, Bridgewater, NJ (US)

(72) Inventor: Daniel Sexton, Bridgewater, NJ (US)

( * ) Notice: Subject to any disclaimer, the term of this patent is extended or adjusted under 35 U.S.C. 154(b) by 0 days.

(21) Appl. No.: 14/887,865

(22) Filed: Oct. 20, 2015

(51) Int. Cl.
*F16K 31/44* (2006.01)
*F16K 5/08* (2006.01)
*F16K 27/06* (2006.01)
*F16K 31/60* (2006.01)

(52) U.S. Cl.
CPC ............... *F16K 31/44* (2013.01); *F16K 5/08* (2013.01); *F16K 27/06* (2013.01); *F16K 31/60* (2013.01)

(58) Field of Classification Search
CPC ........ F16K 31/60; F16K 31/46; F16K 5/0242; F16K 5/0647; F16K 5/0652
USPC .... 251/291–293; 81/90.5, 91.1, 440; 74/544
See application file for complete search history.

(56) References Cited

U.S. PATENT DOCUMENTS

| 1,931,751 | A | * | 10/1933 | Brown | F16K 31/60 251/293 |
| 3,768,775 | A | | 10/1973 | Archer | |
| 4,046,350 | A | | 9/1977 | Massey et al. | |
| 4,266,320 | A | * | 5/1981 | Grant | E03B 9/02 16/427 |
| 4,527,715 | A | * | 7/1985 | Rosenbaum | F17C 13/02 137/382.5 |
| 4,629,157 | A | * | 12/1986 | Tsuchiya | F16K 31/163 137/382 |
| 4,665,386 | A | * | 5/1987 | Haws | F16K 37/0041 116/112 |
| 5,634,486 | A | | 6/1997 | Hatting et al. | |
| 5,711,511 | A | * | 1/1998 | Cynar | F16K 31/46 137/360 |
| 6,085,770 | A | * | 7/2000 | MacNeal | F16K 31/1635 137/15.04 |
| 6,354,322 | B2 | * | 3/2002 | Clark | F01L 13/0005 137/312 |
| 6,443,515 | B1 | * | 9/2002 | Wu | B25B 13/10 269/282 |
| 6,450,069 | B1 | * | 9/2002 | Brahmbhatt | B25B 13/02 81/124.4 |
| 7,048,251 | B2 | | 5/2006 | Schreiner | |
| 7,334,606 | B1 | * | 2/2008 | Hurley | F16K 31/46 137/899 |
| 7,496,999 | B2 | * | 3/2009 | Robarge | B25B 13/48 29/255 |

(Continued)

*Primary Examiner* — Matthew W Jellett
(74) *Attorney, Agent, or Firm* — Thomas J. Germinario

(57) ABSTRACT

A portable apparatus for operatively coupling a source of rotary torque to the rim of a valve handwheel comprises a coupling hub, to which three attachment arms are connected by hinge-type joints. The three attachments arms are equidistantly distributed around the perimeter of the coupling hub and extend radially downward and outward from the hub at an acute extension angle to the hub's central axis. The distal end of each attachment arm comprises a clamp, which is releasably attachable to the rim of the valve handwheel. A coupling stem extends upward from the coupling hub in alignment with the hub's central axis. The coupling stem is configured to connect to the source of rotary torque, so as to transmit the torque through the attachment arms to the rim of the valve handwheel. The length of the extension arms and/or their extension angle can be adjusted for various sizes of valve handwheels to be engaged.

6 Claims, 4 Drawing Sheets

(56) References Cited

U.S. PATENT DOCUMENTS

| | | | |
|---|---|---|---|
| 7,669,833 B2* | 3/2010 | Marcoz | F16K 31/60 16/427 |
| 8,256,742 B2* | 9/2012 | Staffiere | F16K 31/055 251/129.11 |
| 8,733,735 B2 | 5/2014 | Strebe | |
| 2003/0047041 A1* | 3/2003 | Trout | B25B 13/02 81/176.15 |
| 2004/0113116 A1 | 6/2004 | London et al. | |
| 2005/0184266 A1* | 8/2005 | Enston | F16K 51/00 251/291 |
| 2009/0152487 A1 | 6/2009 | Soterhou | |
| 2012/0068094 A1 | 3/2012 | Terrell | |

* cited by examiner

PORTABLE ROTARY VALVE ACTUATOR

FIELD OF INVENTION

The present invention relates to the field of actuators for rotary valves, and more particularly to portable rotary valve actuators for handwheel-operated valves.

BACKGROUND OF THE INVENTION

Valves actuated by turning a handwheel connected to the valve stem are widely used in industrial and utility applications. In such applications, the valve is typically exposed to environments which promote corrosion of the valve mechanism, and particularly the valve stem. Corrosion of the valve stem makes the valve difficult to open, which often results in the valve being only partly opened, which impairs its function and can shorten its useful life.

Regular valve maintenance usually involves a procedure known as "exercising" or "working" the valve, in which the valve handwheel is turned a number of times—depending on the size of the valve—to open it. After a lubricant has been applied to the fully-exposed valve stem, the valve handwheel is then turned the same number of times in the opposite direction to close it. For heavily corroded valves, this procedure can be very difficult, if not impossible, to perform manually.

The present invention addresses this problem by providing a portable device for operatively coupling a source of rotary torque to the rim of a valve handwheel, so as to turn the handwheel and thereby actuate the valve.

SUMMARY OF THE INVENTION

The present invention is a portable apparatus for operatively coupling a source of rotary torque to the rim of a valve handwheel. The source of rotary torque can be a rotary electric or pneumatic motor or a manual ratcheting device.

The apparatus comprises a coupling hub, to which three attachment arms are connected by hinge-type joints. The three attachments arms are equidistantly distributed around the perimeter of the coupling hub and extend radially downward and outward from the hub at an acute extension angle to the hub's central axis. The distal end of each attachment arm comprises a clamp, which is releasably attachable to the rim of the valve handwheel. The clamp can consist of a sleeve secured by a screw or nut or any type of spring-loaded clamp, such as are well known in the art.

A coupling stem extends upward from the coupling hub in alignment with the hub's central axis. The coupling stem is configured to connect to the source of rotary torque, so as to transmit the torque through the attachment arms to the rim of the valve handwheel. If the torque source has a "female" connector, such as an electric drill, then the coupling stem would be "male," such as solid cylindrical, like the shank of a drill bit. If, on the other hand, the torque is generated through a "male" connector, such as the rotor of a pneumatic motor, then the coupling stem would be "female," such as open cylindrical.

In various embodiments of the present invention, the length of the extension arms and/or their extension angle can be adjusted for various sizes of valve handwheels to be engaged. Telescoping segmented attachment arms can be used to extend or retract the arms to engage the rims of handwheels of assorted diameters. Connection means, such as springs or screws, can be provided between the attachment arms and a distal axial extension of the coupling hub, so as to vary the extension angle of the arms to bring them into engagement with handwheels of various diameters.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
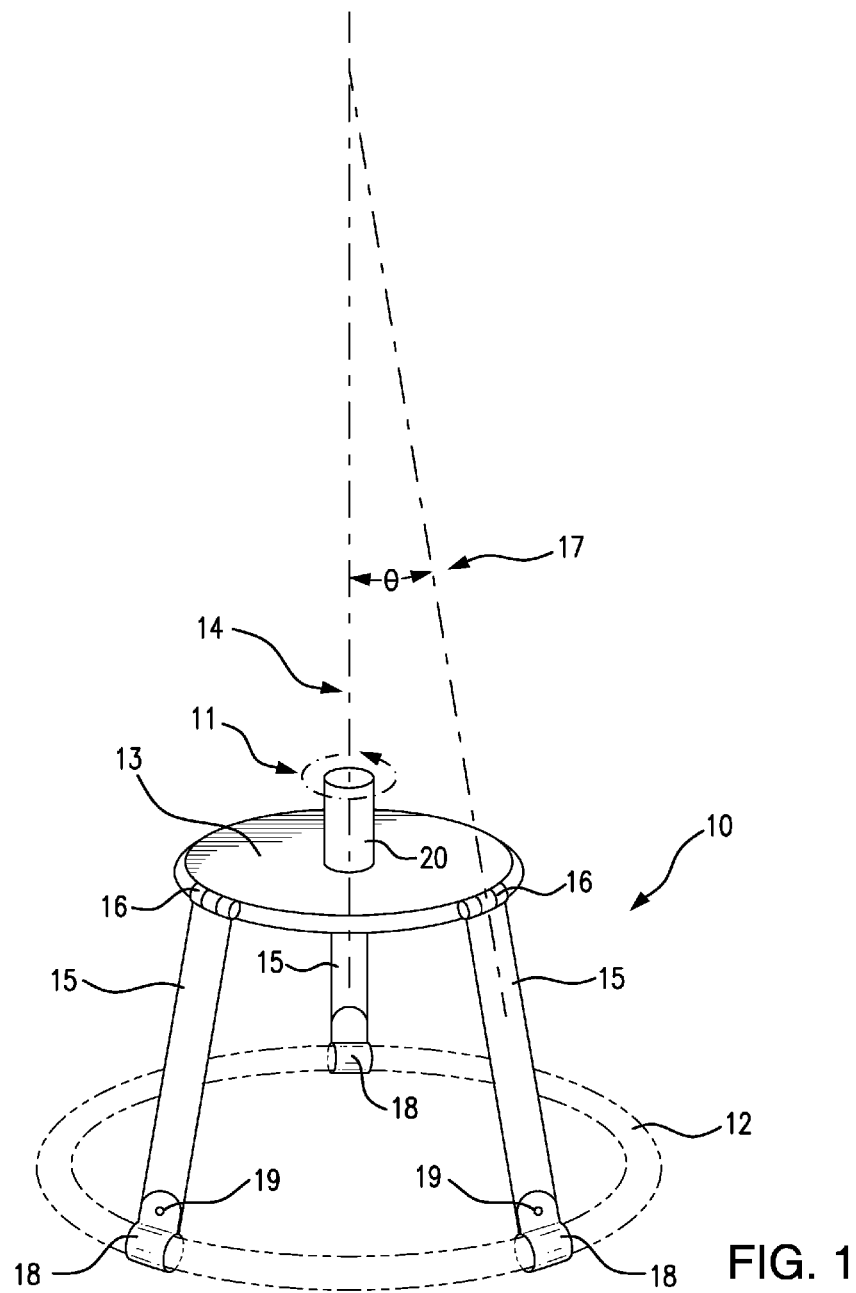
FIG. 1 is a perspective view of the first embodiment of the present invention attached to a valve handwheel shown in ghost view.

Referring to FIG. 1, the first embodiment of the present invention 10 is an apparatus for coupling a source of rotary torque 11 to a valve handwheel having a rim 12. The apparatus 10 comprises a coupling hub 13 having a hub axis 14 positioned at the center of the coupling hub 13 and oriented orthogonally to the coupling hub 13.

Three attachment arms 15 are attached by hinged joints 16 to the coupling hub 13. The hinged joints 16 are spaced equidistantly around the perimeter of the coupling hub 13. The attachment arms 15 extend distally (i.e., downward) from the coupling hub 13 and outward away from the hub axis 14. The attachment arms 14 are oriented at an adjustable acute extension angle θ (0°<θ<90°) 17 to the hub axis 14. The extension angle θ17 can be adjusted within the range 0°-90° by turning the attachment arms 15 about their hinged joints 16.

The distal end of each attachment arm 15 comprises a clamp 18, which is configured to releasably attach to the rim 12 of the valve handwheel. As shown in FIG. 1, the clamp can be a sleeve 18 adapted to encompass the handwheel rim 12, wherein the sleeve 18 can be secured in a closed configuration by a screw or nut 19. The clamp 18 may also engage the rim 12 with opposing spring-loaded arms (not shown).

A coupling stem 20 extends proximally (i.e., upward) from the center of the coupling hub 13 in alignment with the hub axis 14. The coupling stem 20 is adapted to connect to the source of rotary torque 11 and to transmit the rotary torque 11, through the coupling hub 13 and the attachment arms 15, to the handwheel rim 12, so as to turn the valve handwheel and thereby open or close the valve. While FIG. 1 depicts a "male" type coupling stem 20, the coupling stem 20 can also have a "female" configuration, in either case complementary to the output configuration of the source of rotary torque 11.

Figure 2:
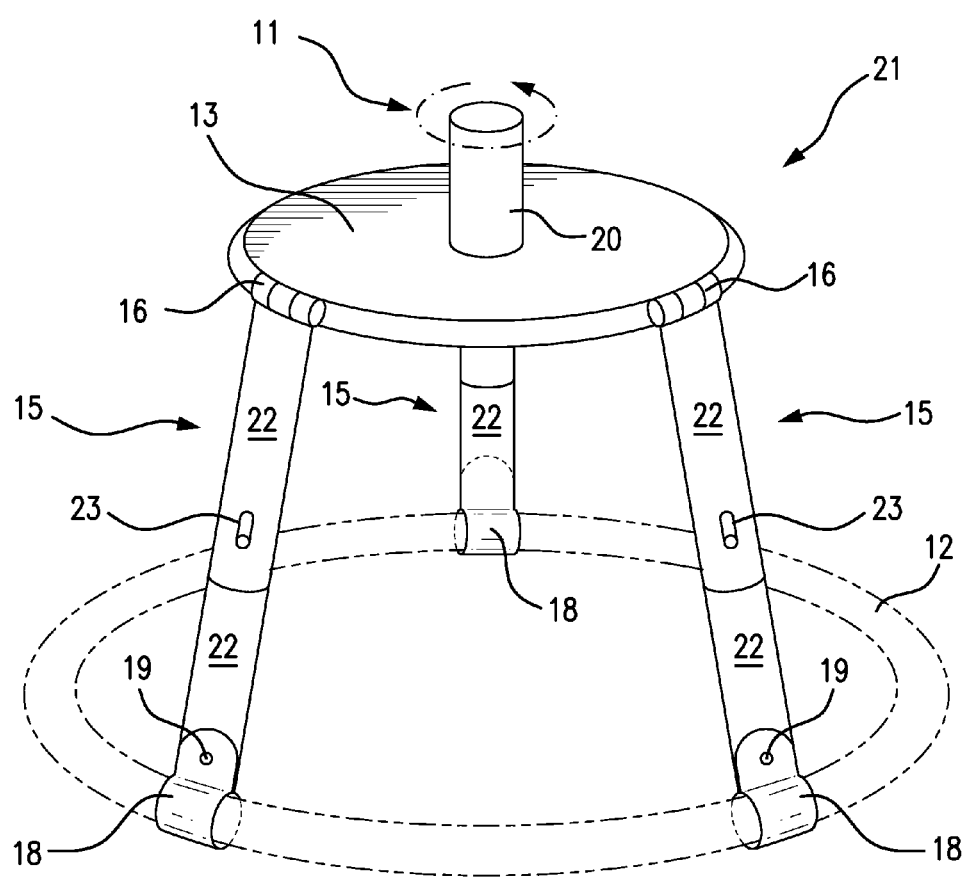
FIG. 2 is a perspective view of the second embodiment of the present invention attached to a valve handwheel shown in ghost view.

In the first embodiment shown in FIG. 1, the attachment arms 15 are extended to engage handwheel rims 12 of various diameters by simply turning the arms 15 about their hinged joints 16, thereby varying the extension angle θ 17. In the second embodiment 21 depicted in FIG. 2, each of the attachment arms 15 comprises two or more telescoping segments 22 with locking mechanisms 23. By adjusting the telescoping segments 22, the length of attachment arms 15 can be varied so as to engage the rims 12 of valve handwheels having assorted diameters.

Figure 3:
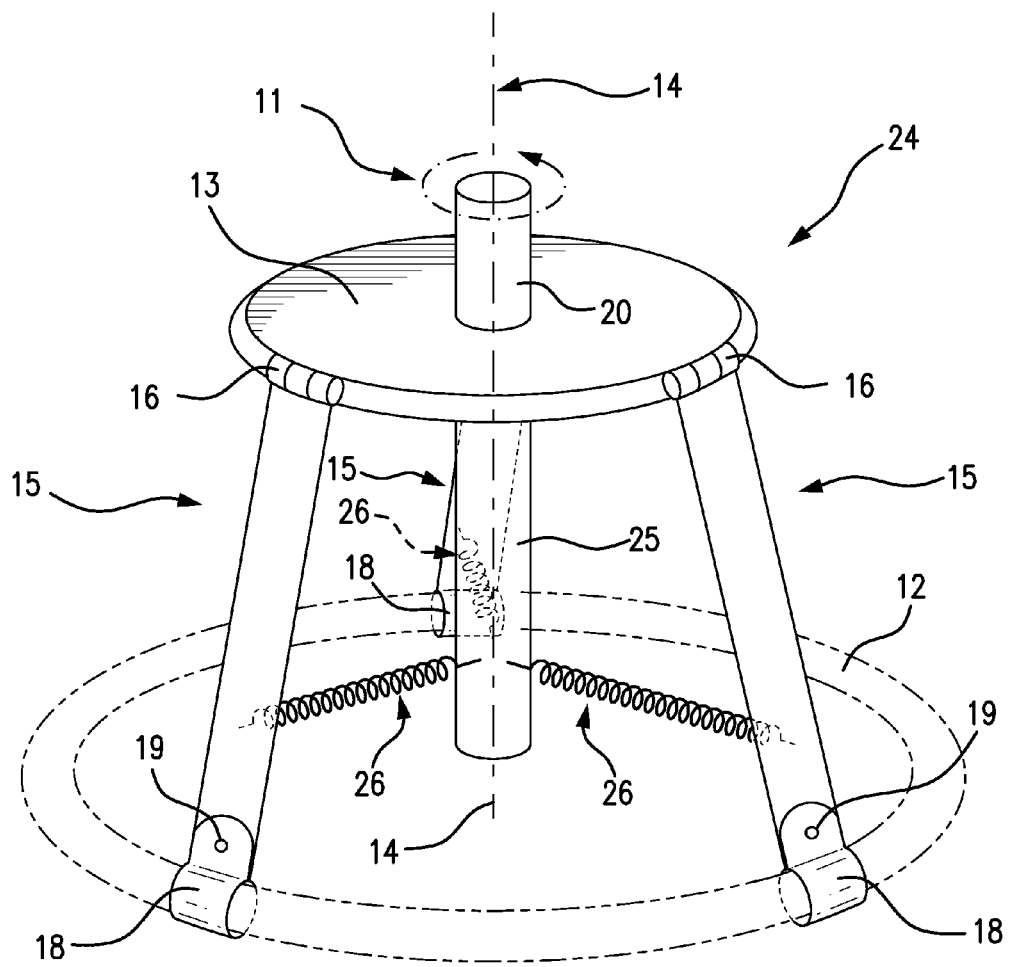
FIG. 3 is a perspective view of the third embodiment of the present invention attached to a valve handwheel shown in ghost view.
Figure 4:
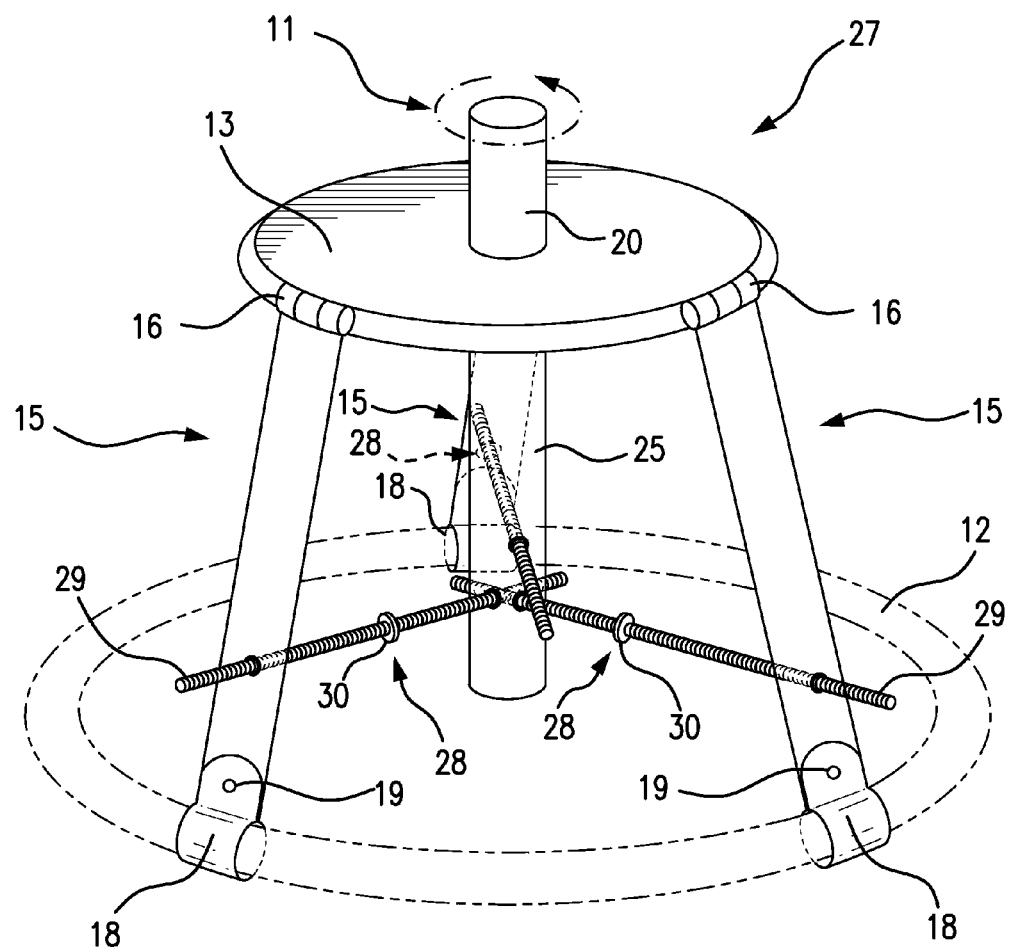
FIG. 4 is a perspective view of the fourth embodiment of the present invention attached to a valve handwheel shown in ghost view.

In the third embodiment 24 shown in FIG. 3, a hub extension 25 extends distally (i.e., downward) from the coupling hub 13 in alignment with the hub axis 14. The hub extension 25 is connected to each of attachment arms 15 by an adjustable connection means, in this case springs 26. These spring connection means 26 enable the extension angle θ 17 to be varied under tension, so as to increase or reduce the outward reach of the attachment arms 15 and their clamps 18 in order to engage the rims 12 of valve handwheels having various diameters. The fourth embodiment 27 depicted in FIG. 4 is a similar configuration to that of the third embodiment 24, but with screw mechanisms 28 serving as the adjustable connection means between the attachment arms 15 and the hub extension 25. As illustrated in FIG. 4, the screw mechanism can comprise a threaded shaft 29 and a turning knob 30.

Optimally, each of the embodiments of the present invention can best be applied to the actuation of valves having handwheel diameters in the range of 2 to 8 inches. Sources of rotary torque can include AC or DC electric motors, such as AC or battery-powered electric drills, as well as pneumatic motors and actuators, or manually-operated ratchets.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. An apparatus for operatively coupling a source of a rotary torque to a valve handwheel having a rim, the apparatus comprising:

a coupling hub, having a center, a proximal side and a distal side, and having a hub axis, positioned at the center of coupling hub and oriented orthogonally to the coupling hub;

three attachment arms, which are hingeably attached to the coupling hub in mutual equidistantly spaced relationship, wherein the attachment arms extend distally and peripherally from the coupling hub away from the hub axis at an adjustable acute extension angle to the hub axis, and wherein a distal end of each of said three attachment arms comprises a clamp, which is configured and adapted to releasably attach to the rim of the valve handwheel;

a coupling stem extending proximally from the coupling hub in axial alignment with the hub axis, wherein the coupling stem is configured and adapted to be connected to the source of the rotary torque and to transmit the rotary torque to the rim of the valve handwheel, through the coupling hub and the attachment arms, so as to turn the valve handwheel; and a hub extension, having a proximal end and a distal end, and projecting distally and axially from the coupling hub in axial alignment with the hub axis, wherein the hub extension is connected to each of the attachment arms by an adjustable connection means, and wherein the connection means extend radially from the distal end of the hub extension and are configured and adapted to adjust the extension angle of the attachment arms, so as to extend the attachment arms to engage the rim of the valve handwheel.

2. The apparatus of claim 1, wherein each of the attachment arms comprises two or more telescoping segments, and wherein each of the attachment arms has a length that is variable and adjustable by means of the telescoping segments, so as to extend each of the attachment arms to engage the rim of the valve handwheel.

3. The apparatus of claim 1, wherein the connection means are springs.

4. The apparatus of claim 2, wherein the connection means are springs.

5. The apparatus of claim 1, wherein the connection means are screws.

6. The apparatus of claim 2, wherein the connection means are screws.

* * * * *